US012573632B2

(12) United States Patent
Choi et al.

(10) Patent No.: US 12,573,632 B2
(45) Date of Patent: Mar. 10, 2026

(54) ANODE MIXTURE FOR SECONDARY BATTERY, ANODE AND SECONDARY BATTERY INCLUDING THE SAME

(71) Applicant: LG Chem, Ltd., Seoul (KR)

(72) Inventors: Cheolhoon Choi, Daejeon (KR); Min Ah Kang, Daejeon (KR); Sungjin Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 656 days.

(21) Appl. No.: 17/775,730

(22) PCT Filed: Oct. 22, 2021

(86) PCT No.: PCT/KR2021/014869
§ 371 (c)(1),
(2) Date: May 10, 2022

(87) PCT Pub. No.: WO2022/086249
PCT Pub. Date: Apr. 28, 2022

(65) Prior Publication Data

US 2023/0015326 A1 Jan. 19, 2023

(30) Foreign Application Priority Data

Oct. 23, 2020 (KR) ........................ 10-2020-0138514
Oct. 21, 2021 (KR) ........................ 10-2021-0141343

(51) Int. Cl.

| | |
|---|---|
| ***C08F 2/22*** | (2006.01) |
| ***C08F 220/06*** | (2006.01) |
| ***C08F 220/46*** | (2006.01) |
| ***C08F 220/48*** | (2006.01) |
| ***C08F 220/56*** | (2006.01) |
| ***H01M 4/583*** | (2010.01) |
| ***H01M 4/62*** | (2006.01) |

(52) U.S. Cl.
CPC ............... *H01M 4/622* (2013.01); *C08F 2/22* (2013.01); *C08F 220/06* (2013.01); *C08F 220/46* (2013.01); *C08F 220/48* (2013.01); *C08F 220/56* (2013.01); *H01M 4/583* (2013.01)

(58) Field of Classification Search
CPC .... H01M 4/622; H01M 4/583; H01M 4/0404; H01M 4/133; H01M 4/139; H01M 4/587; H01M 10/0525; C08F 2/22; C08F 220/06; C08F 220/46; C08F 220/48; C08F 220/56; Y02E 60/10
See application file for complete search history.

(56) References Cited

U.S. PATENT DOCUMENTS

2006/0148938 A1 7/2006 Dungworth et al.
2011/0003207 A1 1/2011 Oh et al.
2013/0136935 A1 5/2013 Sedillo
2019/0305315 A1 10/2019 Fukuchi
2020/0071441 A1* 3/2020 Anderson ................ C09D 7/43
2020/0203704 A1* 6/2020 Oakes .................. C09D 5/4407
2020/0381735 A1 12/2020 Oh et al.
2021/0151760 A1 5/2021 Choi et al.
2021/0384512 A1 12/2021 Choi et al.
2023/0141592 A1* 5/2023 Jiang ..................... H01M 4/139
252/506

FOREIGN PATENT DOCUMENTS

| | | | |
|---|---|---|---|
| CN | 101926032 | A | 12/2010 |
| CN | 105742641 | A | 7/2016 |
| CN | 110885650 | A | 3/2020 |
| CN | 111433945 | A | 7/2020 |
| JP | 2006519280 | A | 8/2006 |
| JP | 2012151108 | A | 8/2012 |
| JP | 2018006334 | A | 1/2018 |
| JP | 2018101519 | A | 6/2018 |
| JP | 2020017504 | A | 1/2020 |
| JP | 2020043064 | A | 3/2020 |
| KR | 20130113965 | A | 10/2013 |
| KR | 101686475 | B1 | 12/2016 |
| KR | 20170075493 | A | 7/2017 |
| KR | 20180075308 | A | 7/2018 |
| KR | 20190022332 | A | 3/2019 |
| KR | 20190104879 | A | 9/2019 |
| KR | 20190133412 | A | 12/2019 |
| KR | 20200028854 | A | 3/2020 |
| KR | 20200074889 | A | 6/2020 |
| KR | 20200139016 | A | 12/2020 |
| KR | 20210034966 | A | 3/2021 |
| WO | 2019168278 | A1 | 9/2019 |
| WO | 2020130586 | A1 | 6/2020 |

OTHER PUBLICATIONS

Machine translation of WO2020130586A1 description (Year: 2024).*
Machine translation of KR20190133412A.*
Machine translation of WO2020130586A1.*
Machine translation of Choi (WO2019168278A1).*
Machine translation of Ozaki (KR20200028854 A).*
Search report from International Application No. PCT/KR2021/014869, mailed on Feb. 8, 2022.

(Continued)

*Primary Examiner* — Matthew T Martin
*Assistant Examiner* — Felicity B Alban
(74) *Attorney, Agent, or Firm* — Lerner David LLP

(57) ABSTRACT

The present disclosure relates to an anode mixture for a secondary battery, an anode and a secondary battery including the same. Specifically, in one embodiment of the present disclosure, there is provided an anode mixture for a secondary battery including a binder composition, which is a mixture of an AAM/AA/AN copolymer and HASE, in a specific content range.

18 Claims, No Drawings

(56) References Cited

OTHER PUBLICATIONS

Yuan, Y., et al., "Investigation of a hybrid binder constitution for lithium-sulfur battery application." New Journal of Chemistry, Issue 25, Published May 26, 2020, DOI: 10.1039/D0NJ00558D, 14 pages.
Extended European Search Report including Written Opinion for Application No. 21876725.9 dated Feb. 27, 2023, pp. 1-7.

* cited by examiner

ANODE MIXTURE FOR SECONDARY BATTERY, ANODE AND SECONDARY BATTERY INCLUDING THE SAME

CROSS-REFERENCE TO RELATED APPLICATION(S)

The present application is a national stage entry under 35 U.S.C. § 371 of International Application No. PCT/KR2021/014869 filed on Oct. 22, 2021, which claims priority from Korean Patent Application Nos. 10-2020-0138514 filed on Oct. 23, 2020, and 10-2021-0141343 filed on Oct. 21, 2021, all the disclosures of which are incorporated herein by reference.

TECHNICAL FIELD

The present disclosure relates to an anode mixture for a secondary battery, an anode and a secondary battery including the same.

BACKGROUND OF ART

As the application of secondary batteries, which has been limited to small electronic devices, is expanded to various fields such as automobiles, power storage, etc., various efforts are being made to improve the performance of secondary batteries.

As one example, a method of increasing the capacity and efficiency of a secondary battery by using an anode having a high content of an anode active material has been proposed. However, as the content of the anode active material is increased, the slurry phase of the anode mixture may become unstable, and defects may occur in a subsequent process.

Conventionally, an anode mixture in a slurry phase is prepared by mixing an anode active material and an anode binder in a solvent. At this time, styrene butadiene latex (SBL) is used as the anode binder, and sodium carboxymethyl cellulose (CMC) serving as a dispersant and a thickener is added to adjust a viscosity of the anode mixture.

In this case, SBL has low adhesion and CMC is brittle, and thus it is necessary to sufficiently include SBL and CMC in the anode mixture. However, when the content of the anode active material is increased for high capacity and high efficiency of the secondary battery, the content of SBL and CMC needs to be inevitably decreased.

As the content of the anode active material increases in the anode mixture and the content of SBL and CMC decreases, the slurry phase of the anode mixture may become unstable, thereby causing desorption of the anode active material and contamination of a rolling roll in a subsequent process (e.g., the process of applying and drying the anode mixture on an anode current collector, followed by rolling).

Thus, in order to secure stability of the slurry phase of the anode mixture and reduce defects in the subsequent process, it is necessary to study an anode mixture having a composition different from that of the conventional ones.

DETAILED DESCRIPTION OF THE INVENTION

Technical Problem

In the present disclosure, there are provided an anode mixture to which a binder composition of a new composition substituting for SBL and CMC is applied, a method for preparing the same, and an anode and a secondary battery including the anode mixture.

In the present disclosure, there are also provided an anode for a secondary battery and a secondary battery including the anode mixture.

Technical Solution

Specifically, in one embodiment of the present disclosure, there is provided an anode mixture for a secondary battery including an anode active material and a binder composition, wherein the binder composition includes hydrophobically modified alkali soluble emulsion (HASE); and a copolymer including a first repeating unit derived from an acrylamide (AAM)-based first monomer, a second repeating unit derived from an acrylic acid (AA)-based second monomer, and a third repeating unit derived from an acrylic nitrile (AN)-based third monomer, and a content of the binder composition is 3 to 10 wt % based on a total solid content (100 wt %) in the anode mixture.

In another embodiment of the present disclosure, there is provided a method for preparing an anode mixture for a secondary battery including the steps of:

preparing a copolymer by polymerizing an acrylamide (AAM)-based first monomer, an acrylic acid (AA)-based second monomer, and an acrylic nitrile (AN)-based third monomer;

preparing a binder composition by mixing the copolymer and hydrophobically modified alkali soluble emulsion (HASE); and obtaining an anode mixture by mixing the binder composition and an anode active material, wherein a content of the binder composition is controlled to be 3 to 10 wt % based on a total solid content (100 wt %) in the anode mixture when mixing the binder composition and the anode active material.

In another embodiment of the present disclosure, there is also provided an anode for a secondary battery, including an anode current collector; and an anode mixture layer located on one side or both sides of the anode current collector, and including the above anode mixture.

In another embodiment of the present disclosure, there is also provided an anode for a secondary battery, including an anode active material; and a binder including a polymer derived from hydrophobically modified alkali soluble emulsion (HASE); and a copolymer including a first repeating unit derived from an acrylamide (AAM)-based first monomer, a second repeating unit derived from an acrylic acid (AA)-based second monomer, and a third repeating unit derived from an acrylic nitrile (AN)-based third monomer, wherein a weight ratio between the polymer derived from the hydrophobically modified alkali soluble emulsion (HASE) and the copolymer is 1:1 to 10.

In another embodiment of the present disclosure, there is also provided a secondary battery, including the above anode; an electrolyte; and a cathode.

Advantageous Effects

The anode mixture for the secondary battery of the embodiment includes the binder composition, which is a mixture of HASE with an AAM/AA/AN copolymer, in a specific solid content range, thereby achieving both functions of the binder and the thickener from one binder composition.

In particular, the anode mixture including the binder composition in a specific content range may secure a high initial adhesion of the anode, reduce a desorption area upon slitting of the anode, lower an initial resistance of the anode, and thus ultimately improve a lifespan of the secondary battery.

Accordingly, the anode mixture including the binder composition in a specific content range can substitute for the anode mixture including SBL and CMC.

Detailed Description of the Embodiments

In the present disclosure, the terms "the first", "the second", and the like are used to describe a variety of components, and these terms are merely employed to distinguish a certain component from other components.

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "possess" when used in this disclosure, specify the presence of stated features, numbers, steps, components, or combinations thereof, but do not preclude the presence or addition of one or more other features, numbers, steps, components, or combinations thereof.

Also, as used herein, when a layer or an element is mentioned to be formed "on" or "above" layers or elements, the layer or element may be directly formed on the layers or elements, or other layers or elements may be additionally formed between the layers, on a subject, or on a substrate.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

In the present disclosure, the weight average molecular weight refers to a weight average molecular weight measured by a GPC method and calibrated with polystyrene. In the process of measuring the weight average molecular weight calibrated with polystyrene by a GPC method, a known analyzer, a detector such as a refractive index detector, and an analyzing column may be used. Conventional temperature conditions, solvents, and flow rates can be applied. Specifically, the measurement may be performed using Waters PL-GPC220 and a Polymer Laboratories PLgel MIX-B 300 mm length column. An evaluation temperature is 160° C., and 1,2,4-trichlorobenzene is used for a solvent at a flow rate of 1 mL/min. The sample at a concentration of 10 mg/10 mL is supplied in an amount of 200 μL. Mw may be obtained using a calibration curve formed using a polystyrene standard. 9 kinds of the polystyrene standard were used with the molecular weight (g/mol) of 2,000/10,000/30,000/70,000/200,000/700,000/2,000,000/4,000,000/10,000,000.

Anode Mixture for Secondary Battery

In one embodiment of the present disclosure, there may be provided an anode mixture including an anode active material and a binder composition.

The binder composition may include hydrophobically modified alkali soluble emulsion (HASE); and a copolymer including a first repeating unit derived from an acrylamide (AAM)-based first monomer, a second repeating unit derived from an acrylic acid (AA)-based second monomer, and a third repeating unit derived from an acrylic nitrile (AN)-based third monomer (hereinafter, the above copolymer is referred to as "AAM/AA/AN copolymer" in some cases).

In addition, a content of the binder composition may be limited to a specific range of 3 to 10 wt % or 4 to 10 wt % in a total solid content (100 wt %) in the anode mixture.

The hydrophobically modified alkali soluble emulsion (HASE) may be a copolymer containing an anionic group, a hydrophobic group and a nonionic group, which may be insoluble in water and present in the form of a latex.

The latex-type HASE may have such a high viscosity (300 to 5000 cP @20° C.) that it may be used to increase the viscosity of an aqueous solution.

Meanwhile, in the above copolymer, each repeating unit may be derived from a monomer. For example, the first repeating unit may correspond to a structural unit formed from the first monomer.

The first monomer may be acrylamide (AAM), the second monomer may be acrylic acid (AA), and the third monomer may be acrylic nitrile (AN).

In the AAM/AA/AN copolymer, the AAM-based first repeating unit may enhance the lifespan of the secondary battery due to high Tg; the AA-based second repeating unit may enhance the adhesion of the electrode based on hydrophilicity thereof; and the AN-based third repeating unit may increase the chemical resistance of an electrolyte based on hydrophobicity thereof and may enhance the lifespan of the secondary battery.

The binder composition including the HASE and the AAM/AA/AN copolymer may implement both the functions of the binder and a thickener from one binder composition. In this sense, the binder composition may be referred to as "a one component binder in which the functions of the binder and the thickener are implemented from one binder composition," and may be also abbreviated as "one component binder".

In other words, in the present disclosure, the anode active material, the hydrophobically modified alkali soluble emulsion (HASE), and the binder may not be separately mixed and used, respectively, but the one component binder obtained by mixing the hydrophobically modified alkali soluble emulsion (HASE) and the AAM/AA/AN copolymer including three specific repeating units in advance may be used and mixed with the anode active material.

In addition, the binder according to the present disclosure may use the AAM/AA/AN copolymer rather than a commonly used binder.

Furthermore, according to the present disclosure, when using a one component binder composition including the hydrophobically modified alkali soluble emulsion (HASE) and the AAM/AA/AN copolymer, a solid content range thereof may be within a specific content range, thereby optimally enhancing the properties of the anode mixture. Thus, the use of the anode mixture according to the present disclosure may enable a high initial adhesion of the anode, reduce a desorption area upon slitting of the anode, lower an initial resistance of the anode, and ultimately improve a lifespan of the secondary battery.

When any one of the HASE and the AAM/AA/AN copolymer is excluded from the binder composition, the functions of the materials may fail to harmonize with each other, thereby decreasing the initial adhesion of the anode, the desorption area upon slitting of the anode, the initial resistance of the anode, and ultimately the lifespan of the secondary battery.

In particular, the anode mixture including the binder composition in a specific content range may secure a high initial adhesion of the anode, reduce a desorption area upon slitting of the anode, lower an initial resistance of the anode, and thus ultimately improve a lifespan of the secondary battery.

Thus, the anode mixture including the binder composition in a specific content range may substitute for the anode mixture including SBL and CMC.

Hereinafter, the anode mixture of the embodiment will be described in more detail.

Content of Binder Composition (One Component Binder)

As described above, a solid content of the binder composition may be limited to a specific range of 3 to 10 wt % or 4 to 10 wt % based on a total solid content (100 wt %) in the anode mixture including both the HASE and the AAM/AA/AN copolymer. In this case, a solid content range of the binder composition may be adjusted while being physically mixed after being measured so that the content of the HASE may be 0.5 to 50 wt % and the content of the AAM/AA/AN copolymer may account for the rest of a total amount (100 wt %) of the binder composition.

Even if both the HASE and the AAM/AA/AN copolymer are included, an effect thereof may be insignificant when the content thereof is less than 3 wt % based on a total solid content (100 wt %) in the anode mixture of the binder composition including the same. In contrast, the content of the anode active material may be rather decreased to reduce the capacity and efficiency of the secondary battery when the content is more than 10 wt %.

Thus, when the content of the binder composition satisfies 3 to 10 wt % based on the total solid content (100 wt %) in the anode mixture, and more preferably when the content satisfies 4 to 10 wt %, the excellent properties will be implemented.

In this case, the "solid content in the anode mixture" may include the anode active material and the binder composition, and may further include a solid material such as a conductive material, etc., if added, excluding any solvent added to form a slurry.

Hydrophobically Modified Alkali Soluble Emulsion (HASE)

The HASE may be a dispersion liquid in which an acrylic polymer having an acid functional group is dispersed in water. In an acidic atmosphere of pH 5 or less, polymer chains may be agglomerated to have a rigid coil-type structure, but in a basic atmosphere of pH 7 or more, the polymer chains may be folded out to expand. In this case, the acrylic polymer having an acid functional group may be poly(meth)acrylic acid, etc., but is not limited thereto.

In the present disclosure, alkali soluble emulsion, which is modified to have a hydrophobic functional group by copolymerizing a monomer having a hydrophobic functional group in the alkali soluble emulsion as described above, may be used. In this case, the hydrophobic functional group may be an aliphatic hydrocarbon having a long chain, for example, an alkyl group having 5 to 20 carbon atoms.

Specifically, the hydrophobically modified alkali soluble emulsion may be the one in which an acrylic polymer containing a hydrophobic functional group and an acid functional group is dispersed in water, and more specifically may be the one in which an acrylic polymer bound to a polymer electrolyte main chain having an acid functional group through a hydrophobic pendant functional group is dispersed in water to form a latex form.

As a more specific example, the acrylic polymer containing the hydrophobic functional group and the acid functional group may be a copolymer including a repeating unit represented by the following Chemical Formula 1 and a repeating unit represented by the following Chemical Formula 2, wherein the repeating unit represented by the following Chemical Formula 1 is a hydrophobic functional group, and the repeating unit represented by the following Chemical Formula 2 is an acid functional group:

[Chemical Formula 1]

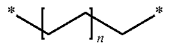

[Chemical Formula 2]

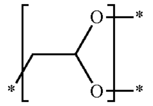

In the Chemical Formula 1, n is an integer of 1 to 10.

As the HASE, a commercially available product may be purchased and used, for example, ASE, HASE, HEUR, etc., from BASF may be used.

The HASE may have a weight average molecular weight of 50,000 to 200,000 g/mol. For example, the weight average molecular weight of the HASE may be 50,000 g/mol or more, 70,000 g/mol or more, 90,000 g/mol or more, or 100,000 g/mol or more, and 200,000 g/mol or less, 180,000 g/mol or less, 160,000 g/mol or less, or 140,000 g/mol or less. The HASE, which satisfies the above condition for weight average molecular weight, may optimize the viscosity of the binder composition used in combination with the AAM/AS/AN copolymer in a specific content, thereby enhancing the initial adhesion of the anode, lowering the amount of electrode desorption upon slitting of the anode, enhancing the initial resistance of the anode, and providing an anode mixture capable of enhancing the lifespan of the secondary battery.

As mentioned above, the HASE in the form of latex may have such a high viscosity of 300 to 5000 Cp at 20° C. that it may be used to increase the viscosity of an aqueous solution.

Accordingly, when the HASE is added to the anode slurry composition, the viscosity may be controlled to enhance stability of the slurry composition.

In addition, the HASE may be added to the binder composition including the AAM/AA/AN copolymer in an emulsion state and used to manufacture an anode, and the HASE may be present in the anode in a solid phase after drying. The solid phase may include a state in which a mixture of the HASE and the AAM/AA/AN copolymer is dispersed.

The HASE content may be 0.5 to 50 wt % of a total amount of the slurry based on a total amount (100 wt %) of the binder composition including the HASE and the AAM/AA/AN copolymer.

However, as the content of the hydrophobically modified alkali soluble emulsion (HASE) in the binder composition increases, the stability of the electrode slurry may be enhanced, but the adhesion of the electrode may decrease. As the content decreases, the adhesion of the electrode may increase, but the stability of the electrode slurry may decrease to cause a change in phase.

In consideration of this tendency, the content of the hydrophobically modified alkali soluble emulsion (HASE) may be 0.5 wt % or more, 5 wt % or more, 15 wt % or more, or 25 wt % or more, and 50 wt % or less, 45 wt % or less, 40 wt % or less, or 35 wt % or less based on the total amount (100 wt %) of the binder composition. Meanwhile, the AAM/AA/AN copolymer may account for the remainder excluding the content of HASE based on the total amount (100 wt %) of the binder composition.

AAM/AA/AN Copolymer

The AAM-based first repeating unit may be included in an amount of 35 to 90 wt %, specifically 40 to 85 wt %, for example, 50 to 80 wt %; the AA-based second repeating unit may be included in an amount of 0.1 to 30 wt %, specifically 1 to 28 wt %, for example, 3 to 25 wt %; and the AN-based third repeating unit may be included in an amount of 5 to 40 wt %, specifically 10 to 35 wt %, for example, 15 to 30 wt % based on the total amount (100 wt %) of the binder composition.

Within this range, the properties of each repeating unit may be harmonized to enhance the lifespan of the secondary battery.

In addition, the AAM/AA/AN copolymer may be provided through a polymerization reaction using a monomer including the first to third repeating units and a polymerization initiator.

Furthermore, the AAM/AA/AN copolymer may be formed in the form of a binder latex having a solid content of 30 to 60 wt % or 40 to 50 wt %. The AAM/AA/AN copolymer may have a weight average molecular weight of 200,000 to 800,000 Mw.

Anode Active Material

The anode active material may be included in an amount of 85 wt % to 95.5 wt % based on the total solid content (100 wt %) in the anode mixture.

As mentioned above, as the content of the anode active material increases, the secondary battery may have high capacity and high efficiency. However, as the content of the anode active material increases, there may be a problem in that the content of the binder composition needs to be relatively decreased.

The content of the binder composition may be adjusted in consideration of such a tendency, and accordingly the content of the anode active material may be determined.

The anode active material may include a material capable of reversibly intercalating and deintercalating lithium ions, lithium metal, an alloy of lithium metal, a material capable of doping to and dedoping from lithium, or a transition metal oxide.

The material capable of reversibly intercalating and deintercalating lithium ions may be a carbon material, in which any carbon-based anode active material generally used in lithium ion secondary batteries may be also used herein, and representative examples thereof may include crystalline carbon, amorphous carbon, or a combination thereof. Examples of the crystalline carbon may include graphite such as amorphous, plate-like, flake, spherical or fibrous natural graphite or artificial graphite, and examples of the amorphous carbon may include soft carbon (low temperature calcined carbon), hard carbon, mesophase pitch carbide, calcined coke, etc.

The alloy of lithium metal used herein may be an alloy of lithium with a metal selected from Na, K, Rb, Cs, Fr, Be, Mg, Ca, Sr, Si, Sb, Pb, In, Zn, Ba, Ra, Ge, Al or Sn.

The material capable of doping to and dedoping from lithium may be Si, $SiO_x$($0<x<2$), Si—C composite, Si-Q alloy (wherein the Q is an alkali metal, an alkaline earth metal, a group 13 to 16 element, a transition metal, a rare earth element, or a combination thereof, but not Si), Sn, $SnO_2$, Sn—C composite, Sn—R (wherein the R is an alkali metal, an alkaline earth metal, a group 13 to 16 element, a transition metal, a rare earth element or a combination thereof, and not Sn), etc. Specific elements of Q and R may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The transition metal oxide may be vanadium oxide, lithium vanadium oxide, etc.

For example, the anode active material may include a carbon-based anode active material, which is artificial graphite, natural graphite, soft carbon, hard carbon, or a combination thereof.

Conductive Material

Meanwhile, the anode mixture may further include a conductive material. The conductive material may be used to impart conductivity to the electrode, and any material may be used in the battery configured as long as it is an electronic conductive material without causing any chemical change. Examples of the conductive material used herein may include carbon-based materials such as natural graphite, artificial graphite, carbon black, acetylene black, ketjen black, carbon fiber, etc.; metal-based materials such as metal powders such as copper, nickel, aluminum, silver, etc., or metal-based materials such as metal fiber, etc.; conductive polymers such as polyphenylene derivatives, etc.; or a mixture thereof.

For example, the conductive material may include at least one selected from the group of carbon-based conductive materials including acetylene black, carbon black, ketjen black, carbon fiber, or a mixture thereof.

The conductive material may be included in an amount of 0.5 wt % to 3 wt % based on the total solid content (100 wt %) in the anode mixture.

Method for Preparing Anode Mixture for Secondary Battery

In another embodiment of the present disclosure, there may be provided a method for preparing an anode mixture for a secondary battery, including the steps of: preparing a copolymer by polymerizing an acrylamide (AAM)-based first monomer, an acrylic acid (AA)-based second monomer, and an acrylic nitrile (AN)-based third monomer; preparing a binder composition by mixing the copolymer and hydrophobically modified alkali soluble emulsion (HASE); and obtaining an anode mixture by mixing the binder composition and an anode active material.

However, when mixing the binder composition and the anode active material, a content of the binder composition may be controlled to be 3 to 10 wt % based on the total solid content (100 wt %) in the anode mixture.

The preparation method may correspond to a method for obtaining an anode mixture with excellent properties described above through a simple process of preparing an AAM/AA/AN copolymer, mixing it with HASE at the above-described ratio to prepare a binder composition (one component binder), and mixing the binder composition with an anode active material.

Hereinafter, a description overlapping with the above-described content will be omitted, and each process thereof will be described in detail.

Process of Preparing an AAM/AA/AN Copolymer

When preparing the AAM/AA/AN copolymer, emulsion polymerization may be used.

Specifically, a monomer mixture may be prepared in consideration of the composition of the AAM/AA/AN copolymer, and may be subjected to emulsion polymerization in the presence of an emulsifier and a polymerization initiator, thereby obtaining an AAM/AA/AN copolymer composition in a latex form.

More specifically, a monomer mixture including 35 to 90 wt % of the first monomer, 0.1 to 30 wt % of the second monomer, and 5 to 40 wt % of the third monomer may be subjected to emulsion polymerization in the presence of an emulsifier and a polymerization initiator.

The description of the content of each monomer in the monomer mixture may be the same as the description of the content of each repeating unit in the AAM/AA/AN copolymer.

The emulsion polymerization may be performed by single polymerization or multi-stage polymerization. In this case, the single polymerization may refer to a method in which the monomers used therein are put into a single reactor and polymerized at the same time, and the multi-stage polymerization may refer to a method in which the monomers used therein are sequentially polymerized in two or more stages.

The emulsion polymerization may be performed in a solution containing an aqueous solvent in the presence of an emulsifier and a polymerization initiator.

A polymerization temperature and polymerization time of the emulsion polymerization may be appropriately determined. For example, the polymerization temperature may be from about 50° C. to about 200° C., and the polymerization time may be from about 0.5 hours to about 20 hours.

As the polymerization initiator usable during the emulsion polymerization, an inorganic or organic peroxide may be used. For example, a water-soluble initiator including potassium persulfate, sodium persulfate, ammonium persulfate, etc., and an oil-soluble initiator including cumene hydroperoxide, benzoyl peroxide, etc., may be used.

In addition, an activator may be further included to promote the initiation of the reaction of the peroxide together with the polymerization initiator, and the activator used herein may be at least one selected from the group consisting of sodium formaldehyde sulfoxylate, sodium ethylenediaminetetraacetate, ferrous sulfate, and dextrose.

And, the emulsifier for the emulsion polymerization used herein may be an anionic emulsifier such as sodium dodecyl diphenyl ether disulfonate, sodium lauryl sulfate, sodium dodecyl benzene sulfonate, dioctyl sodium sulfosuccinate, etc., or nonionic emulsifiers such as polyethylene oxide alkyl ether like polyoxyethylene lauryl ether, polyethylene oxide alkyl aryl ether, polyethylene oxide alkyl amine, polyethylene oxide alkyl ester, etc. The above emulsifier may be a material having a hydrophilic group and a hydrophobic group at the same time, and during the emulsion polymerization process, a micelle structure may be formed and polymerization of each monomer may occur inside the micellar structure. Preferably, the anionic emulsifier and the nonionic emulsifier may be used alone or in combination of two or more types thereof, and using a mixture of the anionic emulsifier and the nonionic emulsifier may be more effective, but the present disclosure is not necessarily limited to such an emulsifier type.

And, the emulsifier may be used in an amount of about 0.01 to about 10 parts by weight, about 1 to about 10 parts by weight, or about 3 to about 5 parts by weight based on 100 parts by weight of the total monomer components used in the preparation of the copolymer.

Process of Mixing AAM/AA/AN Copolymer and HASE (Process of Preparing Binder Composition)

When preparing a binder composition by mixing the AAM/AA/AN copolymer and the HASE, the content of the hydrophobically modified alkali soluble emulsion (HASE) may be 0.5 to 50 wt % based on the total amount (100 wt %) of the binder composition.

The description of the content of the HASE in the binder composition may be the same as described above.

The method for mixing the AAM/AA/AN copolymer and the HASE may not be specifically limited.

Process of Mixing Binder Composition and Anode Active Material (Process of Preparing Anode Mixture)

When mixing the binder composition and the anode active material, the excellent properties of the anode mixture may be implemented only if the content of the binder composition is controlled to be 3 to 10 wt %, and the description thereof may be the same as described above.

A method for mixing the binder composition and the anode active material may not be particularly limited.

For example, a binder-free slurry including an anode active material and a solvent may be prepared, after which a conductive material may be optionally added to the binder-free slurry, and the binder-free slurry and the binder composition may be mixed to prepare the anode mixture slurry.

Anode and Secondary Battery

According to another embodiment of the present disclosure, there is provided an anode for a secondary battery including an anode current collector; and an anode mixture layer located on one side or both sides of the anode current collector, and including the above-described anode mixture.

According to another embodiment of the present disclosure, there is provide an anode for a secondary battery, which includes an anode active material; and a binder including a polymer derived from hydrophobically modified alkali soluble emulsion (HASE); and a copolymer including a first repeating unit derived from an acrylamide (AAM)-based first monomer, a second repeating unit derived from an acrylic acid (AA)-based second monomer, and a third repeating unit derived from an acrylic nitrile (AN)-based third monomer, wherein a weight ratio between the polymer derived from the hydrophobically modified alkali soluble emulsion (HASE) and the copolymer is 1:1 to 10. In this case, the above-described anode current collector may be further included. In addition, the anode current collector and the anode active material may be the same as described later.

The polymer derived from the hydrophobically modified alkali soluble emulsion may include an acrylic polymer including a repeating unit represented by the following Chemical Formula 1 and a repeating unit represented by the following Chemical Formula 2, and may be present in the anode in a dried solid phase after a final drying process:

[Chemical Formula 1]

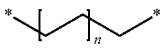

[Chemical Formula 2]

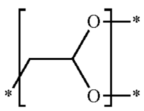

in the Chemical Formula 1, n is an integer of 1 to 10.

In addition, the acrylic polymer dried from the HASE may have a weight average molecular weight of 50,000 to 200,000 g/mol.

A weight ratio between the polymer derived from the hydrophobically modified alkali soluble emulsion (HASE)

and the AAM/AA/AN copolymer may be 1:1 to 10, 1:1.5 to 5, or 1:2 to 4. Herein, when the weight ratio is 1:1 or less, there may be a problem in that electrode adhesion is reduced, and when the weight ratio is 1:10 or more, there may be a problem in dispersibility of the anode slurry.

According to another embodiment of the present disclosure, there is provided a secondary battery including the above anode. The secondary battery specifically includes a cathode; an electrolyte; and the anode.

The anode mixture including the binder composition in a specific content range may secure a high initial adhesion of the anode, reduce a desorption area upon slitting of the anode, lower an initial resistance of the anode, and ultimately improve a lifespan of the secondary battery.

Accordingly, the anode mixture including the binder composition in a specific content range may substitute for the anode mixture including SBL and CMC.

Hereinafter, a description overlapping with the above-described content will be omitted, and the anode and the secondary battery of the embodiment will be described in detail.

The secondary battery may be implemented as a lithium secondary battery.

The lithium secondary battery of the embodiment may further include a separator between the cathode and the anode.

The lithium secondary battery may be classified into a cylindrical shape, a prismatic shape, a coin type, a pouch type, etc. depending on the shape used, and may be divided into a bulk type and a thin film type according to the size. Since the structure and manufacturing method of these batteries are widely known in the art, a minimal description will be added.

The anode includes an anode current collector and an anode active material layer formed on the anode current collector.

As the anode current collector, one selected from the group consisting of copper foil, nickel foil, stainless steel foil, titanium foil, nickel foam, copper foam, a polymer substrate coated with conductive metal, and a combination thereof may be used.

Meanwhile, the cathode includes a current collector and a cathode active material layer formed on the current collector. As the cathode active material, a compound capable of reversibly intercalating and deintercalating lithiums (a lithiated intercalation compound) may be used. Specifically, at least one of composite oxides of lithium with a metal selected from cobalt, manganese, nickel, and a combination thereof may be used. As a more specific example, a compound represented by any one of the following structural formulae may be used.

$Li_aA_{1-b}X_bD_2$ ($0.90 \le a \le 1.8$, $0 \le b \le 0.5$); $Li_aA_{1-b}X_bO_{2-c}D_c$ ($0.90 \le a \le 1.8$, $0 \le b \le 0.5$, $0 \le c \le 0.05$); $LiE_{1-b}X_bO_{2-c}D_c$ ($0 \le b \le 0.5$, $0 \le c \le 0.05$); $LiE_{2-b}X_bO_{4-c}D_c$ ($0 \le b \le 0.5$, $0 \le c \le 0.05$); $Li_aNi_{1-b-c}Co_bX_cD_\alpha$ ($0.90 \le a \le 1.8$, $0 \le b \le 0.5$, $0 \le c \le 0.05$, $0 < \alpha \le 2$); $Li_aNi_{1-b-c}Co_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Co_bX_cO_{2-\alpha}T_2$ ($0.90 \le a \le 1.8$, $0 \le b \le 0.5$, $0 \le c \le 0.05$, $0 < \alpha \le 2$); $Li_aNi_{1-b-c}Mn_bX_cD_\alpha$ ($0.90 \le a \le 1.8$, $0 \le b \le 0.5$, $0 \le c \le 0.05$, $0 < \alpha \le 2$); $Li_aNi_{1-b-c}Mn_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Mn_bX_cO_{2-\alpha}T_\alpha$ ($0.90 \le a \le 1.8$, $0 \le b \le 0.5$, $0 \le c \le 0.05$, $0 < \alpha < 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dGeO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$); LiaCoGbO2($0.90 \le a \le 1.8$, $0.001 \le b \le 0.1$); $Li_aMnG_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMnG_bPO_4$ ($0.90 \le a \le 1.8$, $0.001 \le b \le 0.1$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); $LiFePO_4$ In the above structural formulae, A is selected from the group consisting of Ni, Co, Mn, and a combination thereof; X is selected from the group consisting of Al, Ni, Co, Mn, Cr, Fe, Mg, Sr, V, rare earth elements, and a combination thereof; D is selected from the group consisting of O, F, S, P, and a combination thereof; E is selected from the group consisting of Co, Mn, and a combination thereof; T is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; Z is selected from the group consisting of Cr, V, Fe, Sc, Y, and a combination thereof; and J is selected from the group consisting of V, Cr, Mn, Co, Ni, Cu, and a combination thereof.

Of course, the compound listed above may include an anode mixture layer on its surface, and may be used after mixing with a compound having an anode mixture layer. The anode mixture layer may include at least one coating element compound selected from the group consisting of oxide, hydroxide, oxyhydroxide, oxycarbonate, and hydroxycarbonate of the coating element. The compound for the anode mixture layer may be amorphous or crystalline. The coating element for the coating layer may suitably include Mg, Al, Co, K, Na, Ca, Si, Ti, V, Sn, Ge, Ga, B, As, Zr or a mixture thereof. The anode mixture layer can be formed using any method that does not adversely affect the physical properties of the cathode active material (for example, a spray coating method or a dipping method), as long as the compound uses the above coating element. The coating methods may be well understood by those skilled in the art, and thus a detailed description thereof will be omitted.

The cathode active material layer also includes a cathode binder and a conductive material.

The cathode binder may serve to well attach the cathode active material particles to each other and also to attach the cathode active material to the current collector.

Representative examples of the cathode binder may include polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinyl pyrrolidone, polyurethane, polytetrafluoroethylene, polyvinylidene fluoride, polyethylene, polypropylene, styrene-butadiene rubber, acrylated styrene-butadiene rubber, epoxy resin and nylon, but the present disclosure is not limited thereto.

The conductive material is used to impart conductivity to the electrode, and any electrically conductive material without causing chemical change in the battery can be used. Examples of the conductive material may include natural graphite, artificial graphite, carbon black, acetylene black, ketjen black, carbon fiber, metallic powders such as copper powder, nickel powder, aluminum powder and silver powder, metal fiber, and the like, and conductive materials such as polyphenylene derivatives may be used alone or in combination thereof.

In addition, Al may be used as the current collector, but is not limited thereto.

The anode and the cathode may be prepared by mixing an active material, a conductive material, and a binder in a solvent to prepare an active material slurry, and applying the composition to a current collector, respectively. Since such an electrode manufacturing method is widely known in the art, a detailed description thereof will be omitted herein. The solvent may include, but is not limited to, N-methylpyrrolidone.

Meanwhile, the lithium secondary battery may be a non-aqueous electrolyte secondary battery, and in this case, the non-aqueous electrolyte may include a non-aqueous organic solvent and a lithium salt.

The non-aqueous organic solvent serves as a medium through which ions involved in the electrochemical reaction of the battery can move.

In addition, as mentioned above, a separator may be present between the cathode and the anode. As the separator, polyethylene, polypropylene, polyvinylidene fluoride, or a multilayer film of two or more layers thereof may be used. A mixed multilayer film such as a polyethylene/polypropylene two-layer separator, a polyethylene/polypropylene/polyethylene three-layer separator, and a polypropylene/polyethylene/polypropylene three-layer separator can be used.

Hereinafter, the present invention will be described in detail with reference to the following examples. However, such examples are provided only for better understanding of the present invention, and thus the scope of the present invention is not limited thereto.

HASE (Hydrophobically Modified Alkali Soluble Emulsion)

As the hydrophobically modified alkali-swellable emulsion (HASE), ACRYSOL TT-935 from ROHM and HAAS was used.

A weight average molecular weight thereof is about 120,000 g/mol.

Preparation Example 1: AAM (70 Parts by Weight)/AA (5 Parts by Weight)/AN (25 Parts by Weight) Copolymer 250 parts by weight of distilled water, 70 parts by weight of acrylamide, 5 parts by weight of acrylic acid, and 25 parts by weight of acrylonitrile were added into a pressure stirrer, followed by the addition of 0.4 parts by weight of sodium lauryl sulfate as an emulsifier and 0.5 parts by weight of potassium persulfate as a polymerization initiator, so as to initiate a reaction. Then, the reaction was performed while sufficiently stirring and maintaining at 70° C. for 10 hours to obtain a binder latex having a solid content of 40%.

Preparation Example 2: AAM (60 Parts by Weight)/AA (20 Parts by Weight)/AN (20 Parts by Weight) Copolymer 250 parts by weight of distilled water, 60 parts by weight of acrylamide, 20 parts by weight of acrylic acid, and 20 parts by weight of acrylonitrile were added into a pressure stirrer, followed by the addition of 0.4 parts by weight of sodium lauryl sulfate as an emulsifier and 0.5 parts by weight of potassium persulfate as a polymerization initiator, so as to initiate a reaction. Then, the reaction was performed while sufficiently stirring and maintaining at 70° C. for 10 hours to obtain a binder latex having a solid content of 40%.

Preparation Example 3: Preparation of One Component Binder A 0.3 parts by weight of the HASE and 0.7 parts by weight of the AAM/AA/AN copolymer of Preparation Example 1 were mixed at room temperature to obtain one component binder A.

Preparation Example 4: Preparation of One Component Binder B 0.3 parts by weight of the HASE and 0.7 parts by weight of the AAM/AA/AN copolymer of Preparation Example 2 were mixed at room temperature to obtain one component binder B.

Comparative Example 1: Anode Mixture Including 1.0 wt % of One Component Binder A (1) Preparation of Anode Mixture Slurry First, 5 parts by weight (20 wt % of solid content) of the one component binder A of Preparation Example 3 was added to 50 parts by weight of deionized water as a solvent along with 1 part by weight of a conductive material (SuperC65) while stirring with a homo disper so as to prepare a solution, thereby preparing a dispersion in which the contents were dispersed.

98 parts by weight of the anode active material (natural graphite) was mixed in the dispersion so as to prepare a slurry by using an anode mixer, and 50 parts by weight of deionized water was added to the slurry as a diluent so as to adjust the viscosity of the slurry to about 5,000 cP, thereby preparing an anode slurry composition.

Accordingly, 1.0 wt % of the one component binder A was included based on 100 wt % of the total solid content of the anode mixture slurry of Comparative Example 1.

(2) Preparation of Anode

A copper foil having a thickness of 20 μm was prepared and used as an anode current collector. The anode mixture slurry of Comparative Example 1 was applied on both sides of the anode current collector at a loading amount of 4.0 $mg/cm^2$ per side of the anode current collector using a comma coater, dried with hot air for 10 minutes in an oven at 80° C., and roll-pressed to form an anode mixture layer.

Accordingly, the anode of Comparative Example 1 (total thickness: 80 μm) was obtained.

(3) Preparation of Secondary Battery 90 parts by weight of $Li_{1.03}Ni_{0.6}$ $Co_{0.6}$ $Mn_{0.2}O_2$ as a cathode active material, 5 parts by weight of acetylene black as a conductive material, and 50 parts by weight (10% solid) of polyvinylidene fluoride (PVdF) as a binder were used and mixed in NMP as a solvent while being stirred for one hour. Herein, a slurry phase was adjusted so that the total solid content is 70 wt %, so as to obtain a cathode mixture of Comparative Example 1.

An aluminum foil having a thickness of 20 μm was prepared and used as a cathode current collector. The cathode mixture of above Comparative Example 1 was applied on both sides of the anode current collector at a loading amount of 15.6 $mg/cm^2$ per side of the anode current collector using a comma coater, dried with hot air for 10 minutes in an oven at 80° C., and roll-pressed so that the total thickness is 190 μm. Accordingly, the cathode of Comparative Example 1 was obtained.

A separator was inserted between the anode and the cathode of Comparative Example 1, and subjected to assembly, after which an electrolyte was injected, so as to complete a lithium ion battery according to a method conventionally known in the art.

As the electrolyte, $LiPF_6$ was dissolved in a mixed solvent of ethylene carbonate (EC), propylene carbonate (PC) and diethyl carbonate (DEC) (weight ratio of EC:PC:DEC=3:2:5) to reach a concentration of 1.3 M, and fluoroethylene carbonate (FEC) was added to account for 10 wt % based on the total weight of the electrolyte.

Example 1: Anode Mixture Including 3.0 wt % of One Component Binder A

An anode mixture slurry, an anode, and a secondary battery were prepared in the same method as in Comparative Example 1, except that the content of one component binder A of Preparation Example 3 was changed to 3.0 wt % based on 100 wt % of the total solid content of the anode mixture slurry.

Specifically, in Example 1, 3 parts by weight of the one component binder A was added to 97 parts by weight of the binder-free slurry.

Example 2: Anode Mixture Including 4.0 wt % of One Component Binder A

An anode mixture slurry, an anode, and a secondary battery were prepared in the same method as in Comparative Example 1, except that the content of one component binder A of Preparation Example 3 was changed to 4.0 wt % based on 100 wt % of the total solid content of the anode mixture slurry.

Specifically, in Example 2, 4 parts by weight of the one component binder A was added to 96 parts by weight of the binder-free slurry.

Example 3: Anode Mixture Including 5.0 wt % of One Component Binder A

An anode mixture slurry, an anode, and a secondary battery were prepared in the same method as in Comparative Example 1, except that the content of one component binder A of Preparation Example 3 was changed to 5.0 wt % based on 100 wt % of the total solid content of the anode mixture slurry.

Specifically, in Example 3, 5 parts by weight of the one component binder A was added to 95 parts by weight of the binder-free slurry.

Example 4: Anode Mixture Including 7.0 wt % of One Component Binder A

An anode mixture slurry, an anode, and a secondary battery were prepared in the same method as in Comparative Example 1, except that the content of one component binder A of Preparation Example 3 was changed to 7.0 wt % based on 100 wt % of the total solid content of the anode mixture slurry.

Specifically, in Example 4, 7 parts by weight of the one component binder A was added to 93 parts by weight of the binder-free slurry.

Example 5: Anode Mixture Including 10.0 wt % of One Component Binder A

An anode mixture slurry, an anode, and a secondary battery were prepared in the same method as in Comparative Example 1, except that the content of one component binder A of Preparation Example 3 was changed to 10.0 wt % based on 100 wt % of the total solid content of the anode mixture slurry.

Specifically, in Example 5, 10 parts by weight of the one component binder A was added to 90 parts by weight of the binder-free slurry.

Comparative Example 2: Anode Mixture Including 1.0 wt % of One Component Binder B An anode mixture slurry, an anode, and a secondary battery were prepared in the same method as in Comparative Example 1, except that the one component binder B of Preparation Example 4 was used instead of the one component binder A.

Example 6: Anode Mixture Including 3.0 wt % of One Component Binder A

An anode mixture slurry, an anode, and a secondary battery were prepared in the same method as in Comparative Example 2, except that the content of one component binder B of Preparation Example 4 was changed to 3.0 wt % based on 100 wt % of the total solid content of the anode mixture slurry.

Specifically, in Comparative Example 4, 3 parts by weight of the one component binder B was added to 97 parts by weight of the binder-free slurry.

Example 7: Anode Mixture Including 4.0 wt % of One Component Binder A

An anode mixture slurry, an anode, and a secondary battery were prepared in the same method as in Comparative Example 2, except that the content of one component binder B of Preparation Example 4 was changed to 4.0 wt % based on 100 wt % of the total solid content of the anode mixture slurry.

Specifically, in Example 7, 4 parts by weight of the one component binder B was added to 96 parts by weight of the binder-free slurry.

Example 8: Anode Mixture Including 5.0 wt % of One Component Binder B

An anode mixture slurry, an anode, and a secondary battery were prepared in the same method as in Comparative Example 2, except that the content of one component binder B of Preparation Example 4 was changed to 5.0 wt % based on 100 wt % of the total solid content of the anode mixture slurry.

Specifically, in Example 8, 5 parts by weight of the one component binder B was added to 95 parts by weight of the binder-free slurry.

Example 9: Anode Mixture Including 7.0 wt % of One Component Binder B

An anode mixture slurry, an anode, and a secondary battery were prepared in the same method as in Comparative Example 2, except that the content of one component binder B of Preparation Example 4 was changed to 7.0 wt % based on 100 wt % of the total solid content of the anode mixture slurry.

Specifically, in Example 9, 7 parts by weight of the one component binder B was added to 93 parts by weight of the binder-free slurry.

Example 10: Anode Mixture Including 10.0 wt % of One Component Binder B

An anode mixture slurry, an anode, and a secondary battery were prepared in the same method as in Comparative Example 2, except that the content of one component binder B of Preparation Example 4 was changed to 10.0 wt % based on 100 wt % of the total solid content of the anode mixture slurry.

Specifically, in Example 10, 10 parts by weight of the one component binder B was added to 90 parts by weight of the binder-free slurry.

Comparative Example 3: Anode Mixture Including 1 wt % of Binder SBL and 1.0 wt % of CMC (1) Binder (SB Latex)

250 parts by weight of distilled water, 50 parts by weight of 1,3-butadiene, 34 parts by weight of styrene, 10 parts by weight of methyl methacrylate, 4 parts by weight of acrylic acid, and 2 parts by weight of sodium acrylate were added into a pressure stirrer, followed by the addition of 0.4 parts by weight of sodium lauryl sulfate as an emulsifier and 0.5 parts by weight of potassium persulfate as a polymerization initiator, so as to initiate a reaction. Then, the reaction was performed while sufficiently stirring and maintaining at 70° C. for 10 hours to obtain SBL binder A latex having a solid content of 40%.

(2) Preparation of Anode Mixture Slurry 100 parts by weight of a CMC aqueous solution in which 1 wt % of CMC was dissolved as a dispersant and 1 part by weight of a conductive material (SuperC65) were added and stirred for 0.2 hours to prepare a conductive material dispersion.

To 101 parts by weight of the conductive material dispersion, 98 parts by weight of artificial graphite (D50: 15 um) as an anode active material; and 50 parts by weight of distilled water as a solvent were added and stirred for 0.8 hours to prepare a binder-free slurry.

To 250 parts by weight of the binder-free slurry, 2.5 parts by weight of SBL binder A latex was added and stirred for 20 minutes to obtain an anode mixture slurry of Comparative Example 3.

Accordingly, 1.0 wt % of SBL and 1.0 wt % of CMC are included based on 100 wt % of the total solid content of the anode mixture slurry of Comparative Example 3.

(3) Preparation of Anode and Secondary Battery

An anode and a secondary battery were prepared in the same method as in Comparative Example 1, except that the anode mixture slurry of Comparative Example 3 was used instead of the anode mixture slurry of Comparative Example 1.

Comparative Example 4: Anode Mixture Including 3 wt % of Binder SBL and 1.0 wt % of CMC (1) Binder SBL binder A latex was prepared in the same manner as in Comparative Example 3 and used.

(2) Preparation of Anode Mixture Slurry 100 parts by weight of a CMC aqueous solution in which 1 wt % of CMC was dissolved as a dispersant and 1 part by weight of a conductive material (SuperC65) were added and stirred for 0.2 hours to prepare a conductive material dispersion.

To 101 parts by weight of the conductive material dispersion, 98 parts by weight of artificial graphite (D50: 15 um) as an anode active material; and 50 parts by weight of distilled water as a solvent were added and stirred for 0.8 hours to prepare a binder-free slurry.

To 245 parts by weight of the binder-free slurry, 7.5 parts by weight of SBL binder A latex was added and stirred for 20 minutes to obtain an anode mixture slurry of Comparative Example 6.

Accordingly, 3.0 wt % of SBL and 1.0 wt % of CMC are included based on 100 wt % of the total solid content of the anode mixture slurry of Comparative Example 6.

(3) Preparation of Anode and Secondary Battery

An anode and a secondary battery were prepared in the same method as in Comparative Example 1, except that the anode mixture slurry of Comparative Example 4 was used instead of the anode mixture slurry of Comparative Example 1.

Comparative Example 5: Anode Mixture Including 4.0 wt % of One Component Binder C An anode mixture slurry, an anode, and a secondary battery were prepared in the same method as in Example 7, except for using one component binder C instead of one component binder A.

Specifically, 1 part by weight of the HASE and 3 parts by weight of PAAM (weight average molecular weight: Aladdin, Mw=2,000,000) were mixed at room temperature to obtain one component binder C.

Comparative Example 6: Anode Mixture Including 4.0 wt % of One Component Binder D An anode mixture slurry, an anode, and a secondary battery were prepared in the same method as in Example 7, except for using one component binder D instead of one component binder A.

Specifically, 1 part by weight of the HASE and 3 parts by weight of PAA (weight average molecular weight: Aladdin, Mv=1,250,000) were mixed at room temperature to obtain one component binder D.

Comparative Example 7: Anode Mixture Including 4.0 wt % of One Component Binder E An anode mixture slurry, an anode, and a secondary battery were prepared in the same method as in Example 7, except for using one component binder E instead of one component binder A.

Specifically, 1 part by weight of the HASE and 3 parts by weight of PAN (weight average molecular weight: Mw=150,000) were mixed at room temperature to obtain one component binder E.

Comparative Example 8: Anode Mixture Including 4.0 wt % of PAAM+PAA Mixture

An anode mixture slurry, an anode, and a secondary battery were prepared in the same method as in Example 7, except for using a mixed binder of PAAM and PAA instead of one component binder A.

Specifically, the mixed binder of PAAM and PAA was prepared by mixing PAA (Aladdin, Mv=1,250,000) and PAM (Aladdin, Mw=2,000,000) at a weight ratio of 1:1 at room temperature.

Comparative Example 9: Anode Mixture Including 4.0 wt % of VDF/HFP/AA Copolymer An anode mixture slurry, an anode, and a secondary battery were prepared in the same method as in Example 7, except for using a copolymer binder of VDF, HFP, and AA instead of one component binder A.

Specifically, in order to prepare a mixed binder of PAAM and PAA, 1295 parts by weight of demineralized water, 0.75 parts by weight of methyl cellulose, 4.0 g of propyl peroxydicarbonate, 467.8 g of vinylidene fluoride (VDF), 24.8 parts by weight of hexafluoropropylene (HFP) and 7.4 parts by weight of acrylic acid (AA) were added to a 1 L autoclave reactor, and suspension polymerization was carried out at 28° C. for 60 hours. After the polymerization was completed, the suspension was degassed. Thereafter, the polymer slurry was dehydrated, washed and dehydrated, and then dried in an oven at 80° C. for 24 hours to obtain a copolymer.

The weight average molecular weight of the obtained copolymer was 1,120,000 g/mol.

Comparative Example 10: Anode Mixture Including 20.0 wt % of One Component Binder a An anode mixture slurry, an anode, and a secondary battery were prepared in the same method as in Comparative Example 1, except that the content of one component binder A was changed to 20.0 wt % based on 100 wt % of the total anode mixture slurry.

Specifically, in Comparative Example 10, 20 parts by weight of the one component binder A was added to 79 parts by weight of the binder-free slurry.

Comparative Example 11: Anode Mixture Including 20.0 wt % of One Component Binder B An anode mixture slurry, an anode, and a secondary battery were prepared in the same method as in Comparative Example 2, except that the content of one component binder B was changed to 20.0 wt % based on 100 wt % of the total anode mixture slurry.

Specifically, in Comparative Example 11, 20 parts by weight of the one component binder B was added to 79 parts by weight of the binder-free slurry.

Comparative Example 12: Anode Mixture in which Each Component was Separately Mixed Instead of One Component Binder Anode active material, HASE, SBL binder A latex of Comparative Example 3, and conductive material (SuperC65) were mixed together in a weight ratio of 95:1:3:1, and then dissolved in water to prepare an anode slurry.

Thereafter, an anode, and a secondary battery were prepared in the same manner as in Comparative Example 1.

Comparative Example 13: Anode Mixture Including 3 wt % of One Component Binder F An anode mixture slurry, an anode, and a secondary battery were prepared in the same method as in Comparative Example 1, except that 3 wt % of one component binder F was used instead of one component binder A based on 100 wt % of the total anode mixture slurry.

Specifically, 0.6 parts by weight of the HASE and 0.4 parts by weight of AAM/AA/AN copolymer were mixed at room temperature to obtain one component binder F.

In Comparative Example 13, 3 parts by weight of the one component binder F was added to 96 parts by weight of the binder-free slurry.

The content of the anode active material, the type and content of the binder, and the content of CMC based on the total solid content (100 wt %) of each anode mixture slurry of Examples 1 to 10 and Comparative Examples 1 to 13 are summarized in Table 1 below.

TABLE 1

| | Anode active material | Binder (solid content) | CMC |
|---|---|---|---|
| Comparative Example 1 | 98 wt % of natural graphite | 1.0 wt % of one component binder A | — |
| Example 1 | 96 wt % of natural graphite | 3.0 wt % of one component binder A | — |
| Example 2 | 95 wt % of natural graphite | 4.0 wt % of one component binder A | — |
| Example 3 | 94 wt % of natural graphite | 5.0 wt % of one component binder A | — |
| Example 4 | 92 wt % of natural graphite | 7.0 wt % of one component binder A | |
| Example 5 | 89 wt % of natural graphite | 10.0 wt % of one component binder A | |
| Comparative Example 2 | 98 wt % of natural graphite | 1.0 wt % of one component binder B | — |
| Example 6 | 96 wt % of natural graphite | 3.0 wt % of one component binder B | — |
| Example 7 | 95 wt % of natural graphite | 4.0 wt % of one component binder B | — |
| Example 8 | 94 wt % of natural graphite | 5.0 wt % of one component binder B | — |
| Example 9 | 92 wt % of natural graphite | 7.0 wt % of one component binder B | — |
| Example 10 | 89 wt % of natural graphite | 10.0 wt % of one component binder B | — |
| Comparative Example 3 | 98 wt % of natural graphite | 1 wt % of SBL | 1.0 wt % |
| Comparative Example 4 | 96 wt % of natural graphite | 3 wt % of SBL | 1.0 wt % |
| Comparative Example 5 | 95 wt % of natural graphite | 4.0 wt % of one component binder C | — |
| Comparative Example 6 | 95 wt % of natural graphite | 4.0 wt % of one component binder D | — |
| Comparative Example 7 | 95 wt % of natural graphite | 4.0 wt % of one component binder E | — |
| Comparative Example 8 | 95 wt % of natural graphite | 4.0 wt % of PAAM/PAA mixture | — |
| Comparative Example 9 | 95 wt % of natural graphite | 4.0 wt % of VDF-HFP-AA copolymer | — |
| Comparative Example 10 | 79 wt % of natural graphite | 20.0 wt % of one component binder A | — |
| Comparative Example 11 | 79 wt % of natural graphite | 20.0 wt % of one component binder B | — |
| Comparative Example 12 | 95 wt % of natural graphite | 1 wt % of HASE and 3 wt % of binder of Comparative Example 3 were mixed separately | — |
| Comparative Example 13 | 96 wt % of natural graphite | 3.0 wt % of one component binder F | — |

Experimental Example 1: Evaluation of Stability of Anode Mixture Slurry

In order to evaluate stability during storage, the viscosity was measured immediately after preparation of each anode mixture slurry in Examples 1 to 6 and Comparative Examples 1 to 9, and the viscosity after 24 hours was measured.

At each time point, the viscosity was measured by using a Brookfield viscometer with RV type and spindle #4, and a stable value after 1 minute or more had elapsed at 10 rpm was taken as a viscosity value. And, the slurry was stored in a closed planetary mixer while being stirred at a low speed of 15 rpm until just before viscosity measurement.

The viscosity after 24 hours compared to the initial viscosity was calculated as a percentage (viscosity change rate) according to the following Equation 1, and is shown in table 2 below.

[Equation 1] Viscosity change rate=100*(viscosity after 24 hr)/(initial viscosity)

TABLE 2

| Anode mixture slurry | Viscosity change rate | Anode mixture slurry | Viscosity change rate |
|---|---|---|---|
| Comparative Example 1 | 158% | Comparative Example 3 | 113% |
| Example 1 | 113% | Comparative Example 4 | 110% |
| Example 2 | 110% | Comparative Example 5 | 108% |
| Example 3 | 108% | Comparative Example 6 | 111% |
| Example 4 | 110% | Comparative Example 7 | 110% |
| Example 5 | 107% | Comparative Example 8 | 113% |
| Comparative Example 2 | 163% | Comparative Example 9 | 188% |
| Example 6 | 118% | — | — |

Experimental Example 2: Evaluation of Anode and Secondary Battery

The anode and the lithium secondary battery prepared in Examples 1 to 10 and Comparative Examples 1 to 13 were evaluated under the following conditions, respectively, and the results are shown in table 3 below.

Initial adhesion of anode: Immediately after the preparation of each anode, peel strength was measured five times or more, and an average value thereof is shown in table 3 below. In this case, the peel strength was measured by using a tension measuring instrument (Stable Micro System, TA-XT) as force (gf) required for removing a tape from the anode at a peeling angle of 180° after attaching the anode to an adhesive tape having a width of 10 mm.

Initial resistance of anode: After preparing a coin half cell with the prepared anode as the cathode, a resistance value was measured under the condition of a current rate which was three times the capacity of the coin half cell by using Toscat3100 charge-discharge test system from TOYO.

Desorption area upon slitting of anode: For each anode, slitting was performed under the condition of 20*1000 mm using an electrode punching machine. As a result, the area of the anode mixture layer desorbed from the anode current collector was measured from the area (100 sq %), and a measured value is shown in table 3 below.

Capacity retention after 300 cycles of secondary battery: One cycle was set to discharge each lithium secondary battery to 0.005 V in CC/CV mode at 0.2 C, and then charge up to 1.5 V in CC mode at 0.2 C in a constant temperature chamber at 25° C. with a rest period of 20 minutes between the charging and the discharging. Herein, 300 cycles in total were performed.

As shown in Equation 2 below, the ratio of the discharge capacity measured at 300th cycle to the discharge capacity measured at first cycle was calculated.

[Equation 2]

Capacity retention (%) after 300 cycles=100*(300th charge capacity)/(1st charge capacity)

TABLE 3

| | Initial adhesion of anode | Desorption area upon slitting of anode | Initial resistance of anode | Capacity retention after 300 cycles of secondary battery |
|---|---|---|---|---|
| Comparative Example 1 | 12.3 gf/inch | 1.7 $cm^2$ | 1.2 mΩ | 45% |
| Example 1 | 39.3 gf/inch | 0.6 $cm^2$ | 2.0 mΩ | 68% |
| Example 2 | 58.5 gf/inch | 0.5 $cm^2$ | 2.2 mΩ | 89% |
| Example 3 | 69.7 gf/inch | 0.6 $cm^2$ | 4.1 mΩ | 86% |
| Example 4 | 81.5 gf/inch | 0.5 $cm^2$ | 5.4 mΩ | 92% |
| Example 5 | 112.1 gf/inch | 0.3 $cm^2$ | 8.4 mΩ | 93% |
| Comparative Example 2 | 10.4 gf/inch | 1.9 $cm^2$ | 1.1 mΩ | 58% |
| Example 6 | 32.3 gf/inch | 0.8 $cm^2$ | 1.8 mΩ | 71% |
| Example 7 | 50.4 gf/inch | 1.9 $cm^2$ | 2.0 mΩ | 88% |
| Example 8 | 72.1 gf/inch | 1.9 $cm^2$ | 3.8 mΩ | 87% |
| Example 9 | 80.4 gf/inch | 1.9 $cm^2$ | 5.1 mΩ | 90% |
| Example 10 | 110.5 gf/inch | 1.9 $cm^2$ | 8.0 mΩ | 92% |
| Comparative Example 3 | 8.2 gf/inch | 9.7 $cm^2$ | 2.7 mΩ | 18% |
| Comparative Example 4 | 27.1 gf/inch | 3.8 $cm^2$ | 4.8 mΩ | 28% |
| Comparative Example 5 | 39.8 gf/inch | 0.8 $cm^2$ | 2.9 mΩ | 76% |
| Comparative Example 6 | 40.5 gf/inch | 1.5 $cm^2$ | 2.9 mΩ | 78% |
| Comparative Example 7 | 48.5 gf/inch | 1.0 $cm^2$ | 2.9 mΩ | 70% |
| Comparative Example 8 | 37.8 gf/inch | 1.2 $cm^2$ | 2.8 mΩ | 78% |
| Comparative Example 9 | 21.3 gf/inch | 4.9 $cm^2$ | 8.1 mΩ | 22% |
| Comparative Example 10 | 241.3 gf/inch | 0.2 $cm^2$ | 18.0 mΩ | 93% |
| Comparative Example 11 | 233.3 gf/inch | 0.2 $cm^2$ | 18.5 mΩ | 92% |
| Comparative Example 12 | 18.2 gf/inch | 7.9 $cm^2$ | 3.9 mΩ | 22% |
| Comparative Example 13 | 15.3 gf/inch | 6.0 $cm^2$ | 7.9 mΩ | 19% |

According to above table 3, it could be understood that Examples 1 to 10 secured an initial adhesion of the anode and an initial resistance of the anode, had a very narrow desorption area of the anode mixture layer upon slitting of the anode, and secured a capacity retention of the secondary battery at least 65% and up to 93% after 300 cycles compared to Comparative Examples 1 to 13. In other words, it was found that the anode according to Examples 1 to 10 includes a binder component satisfying a weight ratio range of about 1:2 to 3 between the polymer derived from the hydrophobically modified alkali soluble emulsion (HASE) and the copolymer in the anode, and thus secured a higher initial adhesion of the anode than that of Comparative Examples, reduced a desorption area upon slitting of the anode, lowered an initial resistance of the anode, and showed an excellent capacity retention of the secondary battery after 300 cycles by satisfying at least 65% or more. Thus, when including the anode according to the present disclosure, the lifespan of the secondary battery may be ultimately improved.

Specifically, although the one component binder (one component binders A and B), a mixture of AAM/AA/AN copolymer and HASE, was applied to Comparative Examples 1 and 2, it was found that the content thereof was 1 wt %, respectively, thereby securing an adhesion of 3 gf/inch or more, a resistance of 5.0 mΩ or less, and a desorption area upon slitting of the anode to some extent immediately after the preparation of the anode, but the capacity retention of the secondary battery was 60% or less after 300 cycles, which was lower than that of Examples 1 to 10.

In addition, Comparative Examples 3 and 4 in which CMC (sodium carboxymethyl cellulose) as a dispersant and a thickener was mixed together with styrene butadiene latex (SBL) as a conventional anode binder secured an adhesion of 3 gf/inch or more and a resistance of 5.0 mΩ or less immediately after the preparation of the anode, but showed a desorption area of 3 $cm^2$ or more upon slitting of the anode and a capacity retention of the secondary battery as low as less than 30% after 300 cycles.

This means that the anode mixture layer is severely desorbed upon slitting of the anode and the anode adhesion is gradually weakened during the operation of the secondary battery due to the brittle nature of CMC and the low adhesion of SBL.

Meanwhile, in Comparative Examples 5 to 7 in which CMC was not used and a mixture of HASE with any one of PAAM, PAA and PAN (one component binders C to E) was applied as a binder, the test results were improved compared to Comparative Examples 3 and 4. However, the desorption area upon slitting of the anode was as wide as 0.8 $cm^2$ or more, and the capacity retention of the secondary battery after 300 cycles was as low as less than 80%. In addition, Comparative Examples 5 to 7 showed a resistance of 5.0 mΩ or less, but a high initial resistance compared to Examples 1, 2, 6, and 7 having a similar solid content (3 to 4 wt %) using the one component binder A or B, thereby showing less effect than above Example.

In Comparative Example 8 in which a mixture of PAAM and PAA was applied as a binder without using a thickener (CMC), the test results were improved compared to Comparative Examples 3 and 4. However, the desorption area upon slitting of the anode was as wide as 1.2 $cm^2$ or more, and the capacity retention of the secondary battery after 300 cycles was as low as less than 80%.

In Comparative Example 9 in which a VDF-HFP-AA copolymer was applied as a binder without using a thickener (CMC), the test results were rather inferior to those of Comparative Examples 3 and 4.

Comparative Examples 10 and 11 in which 20% of the one component binders A and B were applied, respectively, secured the adhesion of 3 gf/inch or more immediately after the preparation of the anode, the capacity retention of the secondary battery of 80% or more after 300 cycles, and the desorption area upon slitting of the anode of 3 $cm^2$ or less, but showed a resistance of 5.0 mΩ or more.

In Comparative Example 12, the HASE was used, but the one component binder was not used and an anode was prepared by using an anode slurry in which each component is mixed at once. In particular, as SBL binder latex was used as in Comparative Examples 3 and 4, the desorption area upon slitting of the anode was as wide as 7 $cm^2$ or more and the capacity retention of the secondary battery was as low as less than 25%. In addition, in Comparative Example 12, the initial adhesion of the anode and the initial resistance of the anode were inferior to those of Examples.

In Comparative Example 13, the content ratio of the AAM/AA/AN copolymer to the HASE was about 1:0.7, in which the copolymer ratio was small, and thus the initial adhesion of 3 gf/inch or more was secured immediately after the preparation of the anode, but the desorption area upon slitting of the anode was as wide as 6 $cm^2$ or more, and the capacity retention of the secondary battery was as low as less than 20% after 300 cycles.

In contrast, Examples 1 to 10 used the one component binder (one component binders A and B) that is a mixture of the AAM/AA/AN copolymer and the HASE, and a content of the one component binder is limited to a specific range of 3 to 10 wt % based on the solid content (100 wt %) of the anode mixture slurry.

Accordingly, it was found that Examples 1 to 10 had a very narrow desorption area of 2.0 $cm^2$ or less upon slitting of the anode while securing an adhesion of 30 gf/inch or more and a resistance of 9.0 mΩ or less immediately after the preparation of the anode, and secured the capacity retention of the secondary battery of 65% or more after 300 cycles.

In Examples 1 to 10, it was confirmed that the initial adhesion and resistance of the anode, the desorption area upon slitting of the anode, and the lifespan of the secondary battery vary depending on the polymerization ratio of AAM/AA/AN, the mixing ratio thereof with the HASE, etc.

Thus, it is possible to implement the anode and the secondary battery with excellent properties as long as the one component binder, which is a mixture of the AAM/AA/AN copolymer and the HASE, is applied and the content thereof in the anode mixture slurry is limited to a specific range, and it is possible to control the properties of the anode and the secondary battery by adjusting the polymerization ratio of AAM/AA/AN and the mixing ratio thereof with the HASE.

The invention claimed is:

1. An anode mixture for a secondary battery, comprising an anode active material and a binder composition, wherein the binder composition is a one component binder comprising:

hydrophobically modified alkali soluble emulsion (HASE); and a copolymer comprising a first repeating unit derived from an acrylamide (AAM)-based first monomer, a second repeating unit derived from an acrylic acid (AA)-based second monomer, and a third repeating unit derived from an acrylic nitrile (AN)-based third monomer, and the hydrophobically modified alkali soluble emulsion (HASE) and the copolymer are included in a weight ratio of 1:1.5 to 1:5, and the first repeating unit is included in an amount of 35 to 90 wt %, the second repeating unit is included in an amount of 0.1 to 30 wt %, and the third repeating unit is included in an amount of 5 to 40 wt % based on a total amount (100 wt %) of the copolymer, and wherein the binder composition is included in an amount of 3 to 10 wt % based on a total solid content (100 wt %) in the anode mixture.

2. The anode mixture for a secondary battery of claim 1, wherein the hydrophobically modified alkali soluble emulsion (HASE) comprises an acrylic polymer containing a hydrophobic functional group and an acid functional group.

3. The anode mixture for a secondary battery of claim 2, wherein the acrylic polymer containing the hydrophobic functional group and the acid functional group comprises a repeating unit represented by Chemical Formula 1 and a repeating unit represented by Chemical Formula 2:

[Chemical Formula 1]

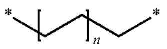

[Chemical Formula 2]

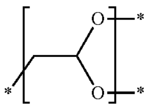

in the Chemical Formula 1, n is an integer of 1 to 10.

4. The anode mixture for a secondary battery of claim 2, wherein a weight average molecular weight of the acrylic polymer containing the hydrophobic functional group and the acid functional group is 50,000 to 200,000 g/mol.

5. The anode mixture for a secondary battery of claim 2, wherein the hydrophobically modified alkali soluble emulsion (HASE) comprises water as a dispersion medium.

6. The anode mixture for a secondary battery of claim 1, wherein the hydrophobically modified alkali soluble emulsion (HASE) has a viscosity of 300 to 5000 cP at 20° C.

7. The anode mixture for a secondary battery of claim 1, wherein the hydrophobically modified alkali soluble emulsion (HASE) is included in an amount of 0.5 to 50 wt % based on a total amount (100 wt %) of the binder composition.

8. The anode mixture for a secondary battery of claim 1, wherein the anode active material is artificial graphite, natural graphite, soft carbon, hard carbon, or a combination thereof.

9. The anode mixture for a secondary battery of claim 1, further comprising a conductive material.

10. A method for preparing the anode mixture of claim 1, the method comprising:

preparing the copolymer by polymerizing the acrylamide (AAM)-based first monomer, the acrylic acid (AA)-based second monomer, and the acrylic nitrile (AN)-based third monomer;

preparing the binder composition as the one-component binder by mixing the copolymer and the hydrophobically modified alkali soluble emulsion (HASE); and obtaining the anode mixture by mixing the binder composition and the anode active material.

11. The method for preparing an anode mixture for a secondary battery of claim 10, wherein emulsion polymerization is used in the preparation of the copolymer.

12. An anode for a secondary battery, comprising an anode current collector; and an anode mixture layer located on one side or both sides of the anode current collector, and comprising the anode mixture of claim 1.

13. An anode for a secondary battery, comprising an anode active material; and a one component binder comprising a polymer derived from hydrophobically modified alkali soluble emulsion (HASE); and a copolymer comprising a first repeating unit derived from an acrylamide (AAM)-based first monomer, a second repeating unit derived from an acrylic acid (AA)-based second monomer, and a third repeating unit derived from an acrylic nitrile (AN)-based third monomer, wherein the hydrophobically modified alkali soluble emulsion (HASE) and the copolymer are included in a weight ratio of 1:1.5 to 5, and the first repeating unit is included in an amount of 35 to 90 wt %, the second repeating unit is included in an amount of 0.1 to 30 wt %, and the third repeating unit is included in an amount of 5 to 40 wt % based on a total amount (100 wt %) of the copolymer.

14. The anode for the secondary battery of claim 13, wherein the polymer derived from the hydrophobically modified alkali soluble emulsion (HASE) comprises an acrylic polymer comprising a repeating unit represented by Chemical Formula 1 and a repeating unit represented by Chemical Formula 2, and is present in the anode in a dried solid state:

[Chemical Formula 1]

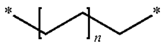

[Chemical Formula 2]

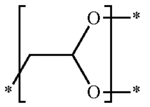

in the Chemical Formula 1, n is an integer of 1 to 10.

15. The anode for the secondary battery of claim 14, wherein the acrylic polymer has a weight average molecular weight of 50,000 to 200,000 g/mol.

16. A secondary battery, comprising the anode of claim 12; an electrolyte; and a cathode.

17. The anode mixture for a secondary battery of claim 2, wherein the hydrophobic functional group is an aliphatic hydrocarbon having an alkyl group having 5 to 20 carbon atoms.

18. The anode mixture for a secondary battery of claim 1, wherein the copolymer has a weight average molecular weight of 200,000 to 800,000.

* * * * *